United States Patent [19]
Duff et al.

[11] 3,863,555
[45] Feb. 4, 1975

[54] VEGETABLE TOP SEVERING DEVICE AND BEARING BLOCK

[76] Inventors: Kenneth J. Duff, 4601 Margalo; Jay W. Deatherage, 1920 Kathryn Ct., both of Bakersfield, Calif. 93309

[22] Filed: Jan. 30, 1974

[21] Appl. No.: 438,122

[52] U.S. Cl............... 99/637, 99/643, 83/328, 83/356.3, 171/33, 171/55
[51] Int. Cl..... A01d 23/04, B23d 25/02, B26d 1/56
[58] Field of Search ......... 83/356.3, 733, 698, 327, 83/328; 99/635, 636, 641, 643; 308/8.2; 171/33, 55

[56] References Cited
UNITED STATES PATENTS

| | | | |
|---|---|---|---|
| 1,942,011 | 1/1934 | Urschel | 171/55 |
| 1,964,896 | 7/1934 | Urschel | 171/33 |
| 2,792,864 | 5/1957 | Krier et al. | 99/641 |
| 3,307,599 | 3/1967 | Vacca et al. | 99/635 X |
| 3,752,243 | 8/1973 | Hummer et al. | 308/8.2 X |
| R20,151 | 10/1936 | Urschel | 171/55 X |

*Primary Examiner*—Willie G. Abercrombie
*Attorney, Agent, or Firm*—Wills, Green & Mueth

[57] ABSTRACT

An improved device for harvesting vegetables, such as carrots and the like, includes a pair of cutter mechanisms, each including a set of conventional elongated cutter blades positioned to cooperatively accept and sever the greens from the root portion of the vegetables. An improved bearing block at each end of each set of cutter blades supports for each blade, a separate pair of tapered roller bearings rotatably supporting a pin which extends from the blade, the combination of the bearings and pin providing for ease and efficiency of lubrication and adjustability to compensate for heavy wear of the bearing.

9 Claims, 4 Drawing Figures

PATENTED FEB 4 1975
3,863,555
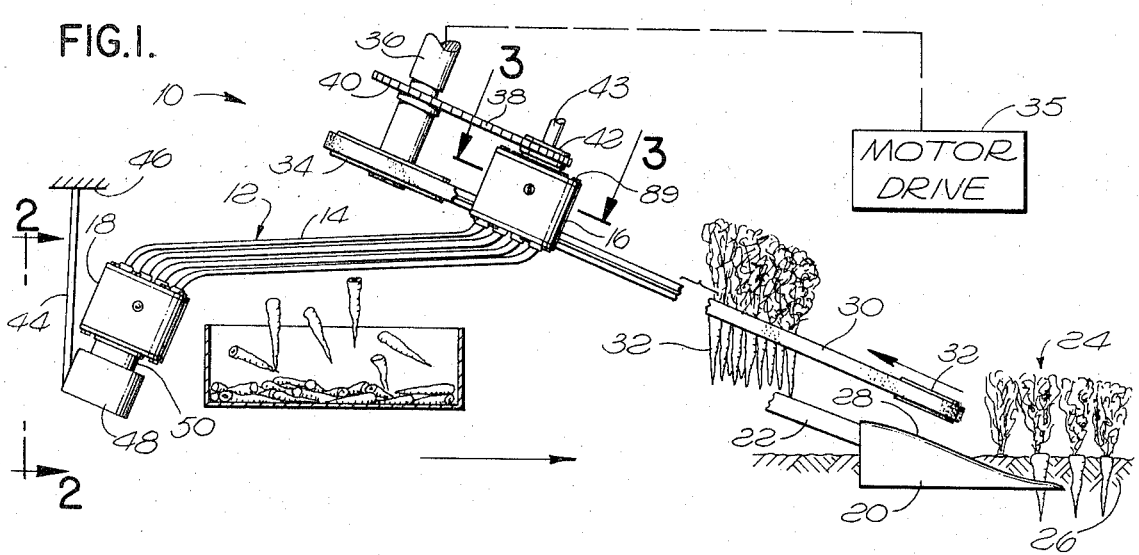
FIG. 1.
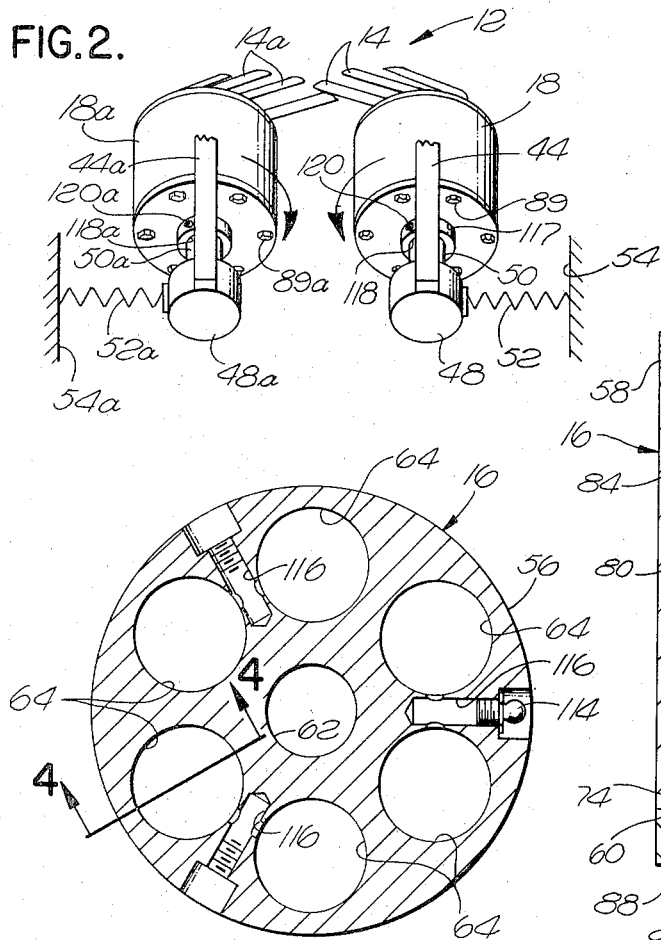
FIG. 2.
FIG. 3.
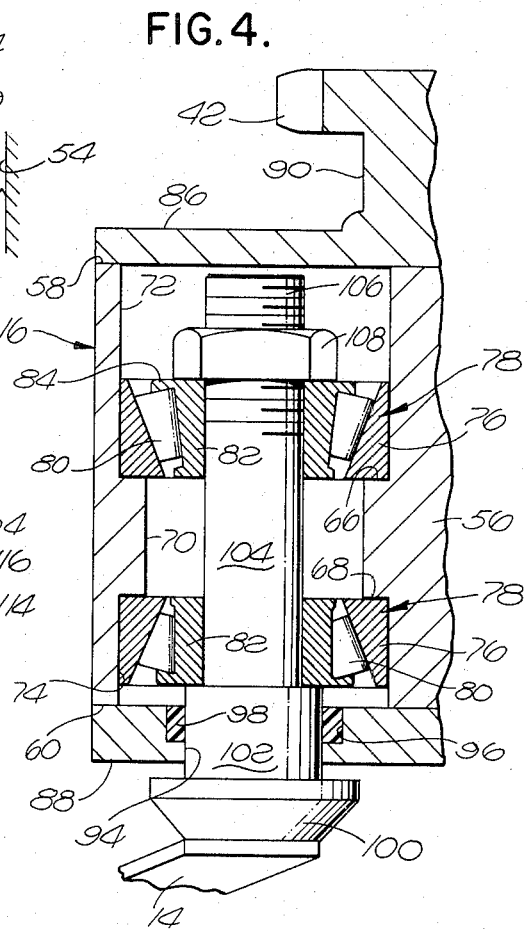
FIG. 4.

3,863,555

VEGETABLE TOP SEVERING DEVICE AND BEARING BLOCK

BACKGROUND AND BRIEF SUMMARY OF THE INVENTION

The leading equipment in the prior art for severing the tops from carrots and similarly shaped vegetables utilizes a first set of cutter blades adapted to rotate about one another and into cutting relation with a second adjacently positioned set of similarly oriented blades. Groups of pins upon the ends if each set of blades in such equipment are retained for rotation about a common axis, each such end being mounted in an individual sleeve within a rotatable block.

Irrespective of the commerical activity of the prior device and the relative mechanical simplicity of the equipment, it has continuously, and throughout the history of its use, suffered from a severe deficiency in one particular, viz. the cutter blade end pins and the sleeves in which they are mounted are highly vulnerable to destructive wear during normal operation. This has resulted in part from the enviroment in which the equipment is required to operate.

As will be better understood upon reviewing the details of the drawings and their description, the vegetables being harvested (usually referred to hereinafter as carrots for convenience), are removed from the ground by a digger element. An appreciable portion of the soil in which the carrots are grown is also removed by the digger element which is used with a complimentary v-belt transport and shaker system, and, because of the great quantity of carrots harvested, a considerable volume of this soil is actually carried by the carrots into direct contact with the cutter blades and support mechanism.

Additionally, since it is desirable to harvest the carrots when the soil is relatively dry, thereby facilitating their removal without an undue quantity of soil adhering to the carrots, the digging and shaking procedure often results in the production of large quantities of dust. Unfortunately, the very nature of the harvesting equipmeent requires that the cutter mechanism follow the digger element and the dust cloud so produced, constantly moving into the dust cloud.

Thus, the cutter blades and their rotatable mountings are continuously subjected to copious amounts of dirt, dust and all manner of grit throughout the operation of the system. The obvious result of such exposure to this highly abrasive environment is severe wear of those relatively rotatable components which are disposed in bearing relationship. During peak harvesting periods this mechanically destructive environment is often so severe as to render the cutter blade end mountings virtually useless within a relatively few days of operation.

Wear of the bearing portions of the mechanism is most severe in those regions of the cutter end-to-sleeve relationship wherein direct metal-to-metal contact takes place, the wear occuring in both the circumferential and axial directions. Accordingly, as such wear occurs, the blades become sloppy in their mountings and move away from their normally retained positions. In such instances the resulting increase in distance between blades and their relative misalignment for cutting purposes becomes a highly significant factor in the accuracy with respect to which tops may be severed from the carrots. Great losses in the weight of carrots harvested and, therefore, profit, are suffered when inaccuracies of this nature continue.

Also, the cost of new blades and the "down-time" and expense of replacing the cutter blades adds considerably to the cost of harvesting the carrots or other vegetables.

With the noted limitations of the existing prior art device in mind, an object of the present invention is to provide a novel, mechanically efficient bearing block structure for supporting the cutter blade-end pins in relatively rotatable, but environmentally sealed relationships.

Another object is to provide in such a structure, a simple and effective bearing means and a lubrication system for protecting the same.

A further object is to provide bearing adjustment means for simultaneously controlled both lateral and axial adjustment with a single, mechanically simple mechanism, thereby facilitating great savings in crop losses and expensive machinery components.

These objects of the invention and improvements over previously utilized equipment are achieved by providing a bearing block mechanism wherein a pair of opposed tapered roller bearings are disposed in spaced relationship about a bearing shaft or pin at each end of each cutter blade. The taper of the roller bearings are preferably oriented inwardly and toward one another, such that an axially positioned retainer can be actuated to adjust the relative positions of the bearings, both laterally and axially.

BRIEF DESCRIPTION OF THE DRAWING

FIG. 1 is a side elevational view of the improved vegetable harvesting device of this invention shown schematically and disposed in its operational environment;

FIG. 2 is an enlarged, elevational view of a pair of typical bearings blocks of the invention, taken along the line 2—2 of FIG. 1;

FIG. 3 is an enlarged, horizontal, sectional view of a bearing block taken along the line 3—3 of FIG. 1 and FIG. 4 is an enlarged, vertical sectional view taken along the line 4—4 of FIG. 3.

DESCRIPTION OF THE PREFERRED EMBODIMENT

In detail, FIG. 1 illustrates the carrot top severing device of this invention as typically installed in a harvester. Therein, a harvesting system 10 includes a cutter mechanism 12 including two sets of cutter blades 14, each set being supported by an upper bearing block 16 and a lower bearing block 18. The harvester system 10 usually comprises a complete mobile unit not shown herein. However certain portions pertinent to this invention are illustrated schematically. A pair of plow blades 20, supported by a frame structure 22 upon either side of the row of carrots to be harvested, comprise part of such structure.

Carrots 24 growing in a row 26, are planted so as to be most effectively engaged and rooted from their positions by the plow blades 20. As the machine progresses forwardly, i.e., from left to right in FIG. 1, the plow blades 20 penetrate in the ground to a predetermined depth and lift the carrots upwardly over the inclined surface 28 of the plow blades. As they progress upwardly, the carrot tops or greens are engaged by a pair of v-belts 30 driven in rotation around a pair of pulleys 32 and 34 such that the junctions between the carrots and their greens are gripped and retained between the v-belts, the carrots depending between the belts. As the carrots progress upwardly, any disorientation of the carrots is corrected by the vibration of the belts and the force of gravity acting upon the carrots. They are thereby carried upwardly in the positions illustrated at 32 of FIG. 1.

As the carrots reach the cutter mechanism 12, they are released from the feed belt 30 and caused to feed between the two sets of cutter blades 14 and 14a of the cutter mechanism 12. It is to be understood that the two sets of cutter blades as better illustrated in FIG. 2, are oriented side by side so as to straddle the v-belts 30 and receive the carrots therefrom.

A motor drive 35 (FIG. 1) is positioned to drive a shaft 36 in rotation, this shaft in turn driving a chain 38 supported upon a first sprocket 40 upon the upper bearing block 16. This movement results in rotation of the upper bearing block 16 which is supported for rotation in this location by conventional shaft support means indicated by the number 43.

The lower bearing block 18 is also supported for rotation in its installed position. This support is provided by a strap 44 connected to structure 46 upon the harvesting machine. The support strap 44, in turn, holds a bearing cup 48, and a rotatable shaft 50 is retained in a free running position therein.

The shaft 50 extends upwardly into the lower bearing block 18 and is rigidly retained therein by conventional means such as a setscrew, for example, for rotation with the bearing block. This facilitates a complete freedom of rotational movement of the lower bearing block 18. The bearing cup 48 is additionally flexibly restrained in its installed position by spring means 52 (FIG. 2) affixed to and extending from structure 54 upon the harvesting machine.

The double cutter mechanism 12 is partially illustrated in FIG. 2, left and right hand portions thereof being indicated by the numerals mentioned above. The left hand portions are additionally identified by the script a to indicate the opposite counterparts of those described.

Rotation of the upper bearing block 16 about its primary axis causes the upper end of each of the individual cutter blades 14, which are supported in the bearing block for rotation with it, to be rotated about that primary axis. Such rotary motion of the cutter blades additionally causes a similar rotation of the lower bearing block 18 and the lower ends of the cutter blades.

Since the two cutter mechanisms are installed side-by-side such that the cutter blades 14 and 14a overlap to a certain extent as the blades mesh with one another, a cutting motion in the nature of a scissors action is defined between the blades of the adjacently positioned cutter mechanisms.

The basic structure and interrelationships described above may be considered to be prior art structure not encompassed by the presently improved invention, the aforesaid description being necessary, however, to full understanding of the present invention.

Because the lower bearing block 18 is similar in construction to the upper bearing block 16 and the improved characteristics relate to both bearing blocks, these improvements contribute markedly to the enhanced operation of the entire cutter mechanism assembly.

As specifically illustrated in FIGS. 3 and 4, the upper bearing block 16 includes a cylindrical body 56 having a first end 58 and a second end 60. This body portion is identical in both bearing blocks 16 and 18.

The body 56 includes therethrough a central bore 62 (FIG. 3) and six secondary bores 64. The secondary bores 64 are circumferentially disposed in an equally spaced relationship about and parallel to the central bore 62. Each secondary bore 64 includes upper and lower shoulders 66 and 68, respectively. A bore region 70 of minor diameter is thereby defined, separating two bore regions of major diameter 72 and 74. The shoulders 66 and 68 provide abutment means or stops against which the outer races 76 of a pair of tapered roller bearings 78 abut. Each said roller bearing is disposed to fit snugly into the respective major diameter bore regions 72 and 74 and to be retained therein as described and illustrated. Each such bearing includes a plurality of tapered rollers 80 riding upon an inner surface of the outer race 76 and the outer surface of an inner race 82, each inner race having an outwardly extending shoulder 84 to support the rollers and prevent their endwise removal.

A first cover member 86 and a second cover member 88 are fixed to the first and second ends 58 and 60, respectively, of the body portion 56 by conventional attachment means such as cap screws 89. The first cover 86 extends over all of the secondary bores at the first end 58 so as to encompass the same in a sealed relationship. It additionally includes a chain sprocket 42, hereinbefore mentioned, which extends and is spaced from the major portion of the first cover by an extension portion 90. Thus, rotation of the sprocket 42 by the drive chain 38 causes the first cover 86, the body 56, and any other portions attached thereto, to rotate as a unit.

The second cover 88 contains a plurality of passageways 94 in axial aligment with the secondary bores 64 of the body 56. At the periphery of each such passageway 94 is an annular seal recess 96 with a seal 98 disposed therein.

Extending from each end of each cutter blade 14 is a pin which includes a boss 100, a cylindrical extension 102, and a shaft 104 which has a threaded end portion 106 with a nut 108 retained thereupon. The extension 102 is of larger diameter than the shaft 104 and is such that it extends through the seal 98 and into engagement with the inner race 82 of the roller bearing 78.

The shaft 104 extends through both rollers bearings 78, with the nut 108 being screwed down into firm engagement with the inner race 82 of its adjacent bearing 78. Thus, the two bearings 78 are firmly retained in position against the shoulders 66 and 68 by the nut 108, sometimes referred to as the securing or adjustment means. If desired a lock nut can also be threaded onto the ends of the shaft 104.

Zerk fittings 114 are located in passages 116 (FIG. 3) which communicate with the secondary bores 64 so that grease may be injected into the region betwenn the roller bearings 78, through the bearings and into the cavities on the opposite sides thereof. Each of the passages 116 interconnect two of the secondary bores 64. Thus, by using a single Zerk fitting, the bearings in two adjacent secondary bores 64 can be simultaneously lubricated.

This forced lubrication capability and the sealed nature of the bearing blocks 16 and 18, in conjunction with the other unique improvements to the mechanism described, serve to greatly extend the useful life of the bearing block and cutter blade mechanisms, well beyond the normally expected life cycle of prior art devices. This holds true even in the presence of the intensely adverse environmental conditions heretofor described, and without detriment to the operational ability of the mechanims.

Even when wear does occur within the bearing block mechanism, such wear can be quickly and easily compensated for by the simple expediement of removing the first cover 86 and tightening each of the nuts 108. Such tightening results in an inward movement of the tapered rollers 80 in the bearings 78, both axially and laterally, thereby compensating for a reasonable amount of wear upon the bearings and, again, considerably extending the useful life of the total mechanism.

It will be understood that while only the upper bearing block 16 has been described in detail, the lower bearing block 18 is similarly constructed. The primary difference between the two being that the first cover 86 and its associated sprocket 42 are changed in configuration to eliminate the sprocket and to replace the same with a boss 117 containing an opening 118 as indicated in FIG. 2. This permits the shaft 50 which is supported in the bearing cups 48 to extend through said boss and to be maintained in position by a set screw 120.

Thus, the utilization of the simple and economically constructed elements described relative to the new and improved bearing blocks of this invention, when combined and utilized with the prior art cutter blades 14, provide a greatly improved cutter mechanism. This imporved device greatly enhances the utility and the economic viability of the system in the harvesting of crops of the nature described. It also successfully meets all of the objects of invention set forth above.

We claim:

1. An improved cutter mechanism for a vegetable harvester having a plurality of double ended cutter blades, the improvement comprising:
   a pair of double ended bearing blocks, each of which includes therein means defining a central bore upon a primary axis thereof, and a plurality of secondary bores equally spaced about said central bore;
   a pair of inwardly directed tapered roller bearings retained in each said secondary bore;
   a cutter blade support pin upon each end of each cutter blade, each said pin being positioned through one of said pairs of bearings in one of said secondary bores; and
   relatively adjustable securing means upon an end of each said pin engaging one of said bearings, whereby converging movement of said securing means causes said pair of bearings to be tightened both laterally and axially.

2. The improved cutter mechanism of claim 1 wherein
   each said secondary bore is provided with abutment means for the pair of bearings to retain said bearings in a predetermined spaced apart relation, and
   said securing means includes a shoulder upon one end of said pin, threads upon an opposite end, and a nut in engagement with said threads, whereby the tightening of said nut accomplishes the coverging movement.

3. The improved cutter mechanism of claim 2 wherein
   a plurality of passage means are provided in each said bearing block leading from an external surface of said bearing block into said secondary bores intermediate of said bearings, and
   a grease fitting is positioned in each said passage whereby grease can be introduced into the region of said bearings through said grease fittings and said passages.

4. The improved cutter mechanism of claim 3 wherein one said passage is positioned between and communicates with each two adjacent secondary bores.

5. The imporved cutter mechanism of claim 1 wherein
   said bearing blocks each includes a body, and a first and a second cover member affixed to opposite ends of said body;
   said first cover member includes circumferentially spaced openings therethrough to receive said pins, and grease seal means in each of said openings; and
   said second cover member includes means thereupon to accommodate the driving of said bearing block in rotation.

6. An improved vegetable harvester bearing block for a cutter blade mechanism comprising:
   a double ended body member having therethrough a central bore and a plurality of secondary bores, said secondary bores being positioned concentrically around said central bore and equidistant from one another;
   a pair of tapered roller bearings secured within each said secondary bore in spaced relation; and
   first and second cover members fixedly disposed over said body member ends, said first cover member including a plurality of openings therethrough in alignment with said secondary bores, and including grease seals therein, and said second cover member including means thereupon to accommodate the driving of said bearing block in rotation.

7. The improved bearing block of claim 6 wherein said secondary bores each includes a central bore portion of minor diameter separating two sections of an outer bore portion of major diameter;
   a shoulder is defined by the joinder of said central bore with each said outer bore portion; and said bearing each including an outer race abutting one of said shoulders.

8. The improved bearing block of claim 7 wherein each said roller bearing is inwardly tapered so as to accommodate both lateral and axial adjustment when inner races thereof are moved toward one another.

9. An improved bearing block for a vegetable harvester cutter blade mechanism comprising:
   a bearing block having first and second ends;
   means in said body defining a central bore therethrough upon a primary rotational axis of said bearing block; and
   a plurality of secondary bores equally spaced about said central bore, each said secondary bore having a central bore portion of minor diameter separating two sections of an outer bore portion of major diameter, a shoulder being defined by the joinder between said central bore and each portion of said outer bore;

a pair of inwardly tapered roller bearings in each said secondary bore, one said bearing abutting each said shoulder;

a first cover plate attached to said first end of said bearing block body and including means therein defining a plurality of seal receptacles, each seal receptacle being disposed coaxially with respect to one of said secondary bores;

a lubricant seal in each said seal receptacle; and a second cover plate attached to said second end of said bearing block body opposite said first cover plate, and means upon said second cover plate coaxial with said central bore for rotating said bearing block.

* * * * *